United States Patent Office 3,135,808
Patented June 2, 1964

3,135,808
PROCESS FOR PREPARING 1,1,1-TRIMETHYLOL-2-METHOXYPROPANE
Max O. Robeson and William T. McNair, Jr., Corpus Christi, Tex., assignors to Celanese Corporation of America, New York, N.Y., a corporation of Delaware
No Drawing. Filed Sept. 21, 1959, Ser. No. 841,012
1 Claim. (Cl. 260—615)

This invention relates to 1,1,1-trimethylol-2-alkoxy alkanes and substituted alkanes.

It is an object of this invention to provide new compounds useful in the variety of applications. It is a further object to provide a method of making these compounds. Other objects will become apparent from the following description of the invention.

Included in one aspect of the invention are new compounds having the formula $RCH(OR')C(CH_2OH)_3$ wherein R' is lower alkyl, e.g. containing up to 4 carbon atoms and R is alkyl or cycloalkyl, e.g. cyclohexyl, or substituted alkyl or cycloalkyl containing any of various substituents, e.g. halogen such as chlorine or bromine, or a hydroxyl or nitro groups, or aryl such as phenyl, naphthyl and biphenylyl and the latter radicals with at least one hydrogen atom replaced by any of various substituents such as hydrocarbon radicals, e.g. lower alkyl such as methyl, ethyl and propyl, or non-hydrocarbon radicals, e.g. halogen such as chlorine and bromine and lower alkoxy such as methoxy, ethoxy and propoxy. Preferably R is lower alkyl, e.g. containing up to 3 carbon atoms.

The above compounds may be made by condensing an aldehyde of the formula $RCH(OR')CH_2CHO$, wherein R and R' are as identified above, with formaldehyde in the presence of a base such as an alkali metal hydroxide or alcoholate, e.g. methylate or an alkaline earth metal hydroxide, e.g., calcium hydroxide. The sodium and potassium hydroxides and methylates are preferred basic compounds. The reaction may be carried out in one step to produce the trimethylol-2-alkoxy compound of this invention, as in the following equation:

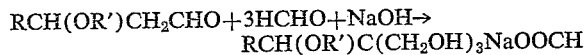

and R and R' are as defined above. When R and R' are both methyl, for example, the formaldehyde is condensed with 3-methoxybutyraldehyde and the resulting product is 1,1,1-trimethylol-2-methoxypropane.

Other specific compounds which may be prepared in a manner similar to that described above are 1,1,1-trimethylol-2-methoxybutane,
1,1,1-trimethylol-2-methoxypentane,
1,1,1-trimethylol-2-methoxy-2-cyclohexylethane,
1,1,1,-trimethylol-2-methoxy-3-chloropropane,
1,1,1-trimethylol-2-methoxy-3-hydroxypropane,
1,1,1-trimethylol-2-methoxy-3-nitropropane,
1,1,1-trimethylol-2-methoxy-3-phenylpropane,
1,1,1-trimethylol-2-methoxy-3-(2-naphthyl) propane,
1,1,1-trimethylol-2-methoxy-3-parabiphenylpropane,
1,1,1-trimethylol-2-methoxy-3-paratolylpropane,
1,1,1-trimethylol-2-methoxy-3-parachlorophenylpropane,
1,1,1-trimethylol-2-methoxy-3-paramethoxyphenylpropane,
1,1,1-trimethylol-2-ethoxypropane,
1,1,1-trimethylol-2-ethoxybutane,
1,1,1-trimethylol-2-propoxypropane, and
1,1,1-trimethylol-2-propoxybutane.

When the condensation reaction to produce the trimethylol compounds of this invention is carried out in one step, the reaction mixture may suitably contain 3 to 10 mols of formaldehyde and 1 to 1.5 mols of basic compound per mol of 3-alkoxyaldehyde starting material. The temperature of the reaction mixture is suitably within the range of 5 to 50° C.

The trimethylol compounds of this invention may also be made in two steps by first condensing the 3-alkoxy aldehyde with just enough formaldehyde to produce the 2,2-dimethylol-3-alkoxy aldehyde. The latter is then catalytically hydrogenated at elevated temperature and pressure to produce the 1,1,1-trimethyl-2-alkoxy compound. The equations for these reactions are as follows:

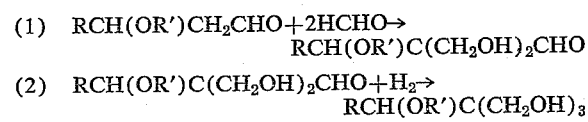

When a two step process is being carried out, the reaction mixture during the initial condensation with formaldehyde may suitably contain 2 to 4 mols of formaldehyde and 0.1 to 0.3 mols of basic compound per mol of 3-alkoxyaldehyde starting material and the initial reaction may be suitably carried out at a temperature of 5 to 50° C. The hydrogenation step is preferably carried out in the liquid phase at a pressure of 500 to 2000 p.s.i.g. and a temperature of 70 to 120° C. Any suitable hydrogenation catalyst may be used, e.g. a nickel-chromium-alloy, platinum or palladium.

The following examples further illustrate the invention.

Example I

Aqueous solutions of formaldehyde and caustic soda, each having a concentration of 20% by weight, were mixed at an initial reaction temperature of 5 to 20° C. with 3-methoxy butyraldehyde, in a mole ratio of formaldehyde to 3-methoxy butyraldehyde to caustic soda of 8 to 1 to 1.2. The temperature of the mixture rose about 30° C. during the reaction. Excess formaldehyde was stripped and the mixture was concentrated by adding excess water and evaporating off the more volatile components at atmospheric pressure to a base temperature of 100 to 125° C. Sodium formate and pentaerythritol were precipitated from the mixture with dry 2-propanol and removed by filtration.

The crude product was vacuum flashed and fractionated. The fraction boiling at 210–220° C. at 50 mm. Hg absolute was ascertained to be mainly 1,1,1-trimethylol-2-methoxypropane. The weight percent of hydroxyls was found to be 30.35 which agrees fairly well with the theoretical value of 31.1 and the weight percent of methoxyls was found to be 18.9, identical with the theoretical value. The melting point of the compound was 54.9–55.9° C.

Example II 0.2 mole of potassium hydroxide as catalyst was added to 1200 cc. of methylal and refluxed to dissolve. Then, paraformaldehyde in an amount yielding 6 moles of formaldehyde was added followed by rapid addition of 2 moles of 3-methoxy butyraldehyde. An exothermic reaction followed at 40 to 45° C. causing the methylal to reflux. After one hour, the mixture showed 2 moles of formaldehyde consumer per mole of 3-methoxybutyraldehyde resulting in the formation of 2,2-dimethylol-3-methoxybutyraldehyde. The methylal was then removed by steam stripping and water was added as a diluent for hydrogenation. Hydrogenation was carried out in fluid phase at elevated pressure using a chromium-nickel alloy catalyst slurried in the reacting mixture. The mixture was contacted with hydrogen at a temperature of 70 to 120° C. and a pressure of 500 to 2,000 p.s.i.g. After hydrogenation, water was removed by vacuum distillation and the crude product residue crystallized using dry ethyl acetate.

*Example III*

The procedure of Example II was repeated except that 0.2 mole of sodium methylate was used as catalyst, the reaction was conducted at 5 to 15° C. and dioxane was used as hydrogenation diluent. In addition, the crude product mixture was flash distilled to remove impurities prior to crystallization with ethyl acetate.

The compounds of this invention are useful in various applications. For example, they may be reacted with polycarboxylic acid such as phthalic or isophthalic acid and if desired with a drying or semi-drying oil e.g. linseed oil to make drying oil modified alkyl resins for use in surface coating compositions. In addition the compounds may be used per se as a plasticizer in various resinous compositions or they may be esterified with acids such as valeric or butyric and the resulting esters used as plasticizers.

It is to be understood that the foregoing detailed description is given merely by way of illustration and that many variations may be made therein without departing from the spirit of our invention.

Having described our invention what we desire to secure by Letters Patent is:

Process comprising condensing 3-methoxybutyraldehyde with 3 to 10 mols of formaldehyde per mol of 3-methoxybutyraldehyde in the presence of 1 to 1.5 mols of sodium hydroxide per mol of 3-methoxybutyraldehyde at a temperature of 5 to 50° C. to obtain 1,1,1-trimethylol-2-methoxypropane.

References Cited in the file of this patent

UNITED STATES PATENTS 2,217,651 Loder _____ Oct. 8, 1940
2,644,013 Barth _____ June 30, 1953

OTHER REFERENCES

Berlow et al.: The Pentaerythritols (1958), pp. 6 and 7.